(No Model.)
W. H. BAKER.
DRAFT EQUALIZER.
No. 306,995. Patented Oct. 21, 1884.
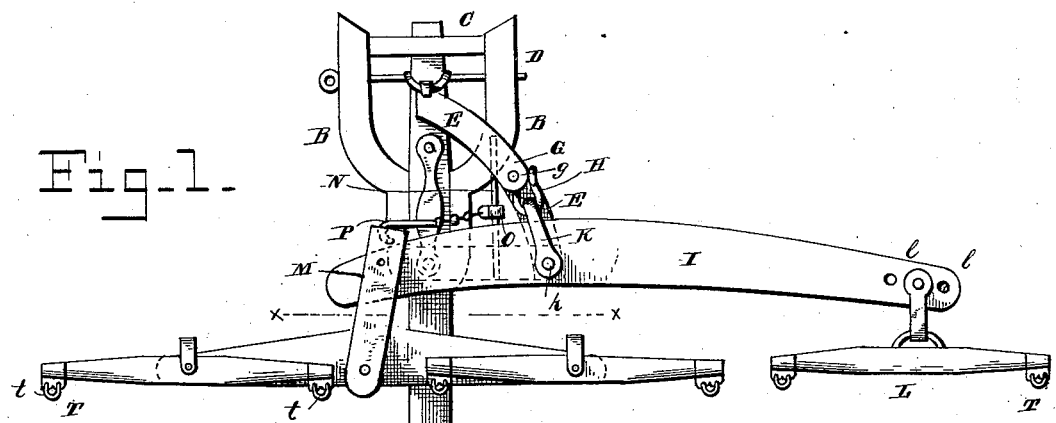
WITNESSES
E. L. Yewell.
J. J. McCarthy.
INVENTOR
William H. Baker.
By C. M. Alexander
Attorney

United States Patent Office.

WILLIAM H. BAKER, OF OXFORD, MICHIGAN.

DRAFT-EQUALIZER.

SPECIFICATION forming part of Letters Patent No. 306,995, dated October 21, 1884.

Application filed March 4, 1884. (No model.)

*To all whom it may concern:*

Be it known that I, WILLIAM H. BAKER, a citizen of the United States, residing at Oxford, in the county of Oakland and State of Michigan, have invented certain new and useful Improvements in Draft-Equalizers, of which the following is a specification, reference being had therein to the accompanying drawings.

My invention relates to improvements in draft-equalizers, and the object is to provide a device that may be used either with or without a pole, and also a means by which the "side draft" may be overcome. The device is also so constructed as to be taken to pieces and the separate parts used for two or one horse, as desired.

In the drawings forming part of this specification, Figure 1 represents a plan view of the three-horse equalizer, and Fig. 2 a detail section through the line $x\,x$ on Fig. 1. Fig. 3 represents a perspective of one of the supporting devices.

A represents the pole, constructed as is usual, and having at its rear end the hounds B, connected by the cross-piece C. In front of the cross-piece C, and passing through the hounds B and the pole A, is the pin D.

E represents an arm hooked at its rear end, and connected to the pole by a link engaging with the pin D. This arm projects outward and forward at an angle with the length of the pole, and is connected with the brace F, which projects at right angles with the pole from a point near the junction of the said pole and the hounds B. The arm E has raised upon it the shorter arm G, through the end of which and also through the arm E passes the pin $g$.

H represents an eye provided with hooks, one of which is at right angles with the other. To this hook is connected the equalizer-arm I by means of the clevis-link K.

$k$ represents a pin, which forms a pivot for the equalizer-arm I, and passes through the link K, and downward through the brace F and arm E, thereby connecting them. The equalizer-arm I has an even forward curve throughout its length for the purpose of preventing interference with the wheel, and also being stronger than if it had a quick curve near its end. The outer and longer end of this arm carries a single-tree, L, connected thereto by a clevis-link, and is also provided with holes $l\,l$, whereby the single-tree may be adjusted nearer to or farther from the fulcrum of the arm, thus making the leverage greater or less. The shorter end of the arm passes over the pole to the other side, and is there connected by a link, M, to an ordinary double-tree. One of the single-trees on said double-tree is on one side of the pole, while the other is on the opposite side. The link M passes both above and below the arm, and is extended backward for a short distance, its rear end being provided with a notch.

N represents a bar parallel with the pole, and passing from the arm E to the brace F, and being connected to them.

O represents a link or roller, adapted to slide on the bar N. It is connected to the hook P, which engages in the notch in the end of the link M by means of a chain or similar attachment. The purpose of this is to prevent side draft, which would result from the center of the draft of the three horses being at one side of the pole. It obviates the said side draft by giving two points for the direct draft, instead of one, and by forcing the link M outward, so as to be at an angle with the pole, as shown. It gives a greater leverage than when said link is parallel with the pole.

R represents a neck-yoke bar, of usual construction, and carrying on one end the additional bar S, so as to accommodate the three horses and equalize the "pull-back."

T represents a ferrule fitting over and fastened to the ends of the single-trees, and has cast upon it a flange, through which are two holes to receive the ends of the eyes $t$. To these eyes are fastened the traces.

When it is desired to use the device without a pole, the pin $g$ is withdrawn, and the eye H is hooked to the draft-ring of the machine to be drawn.

The operation of the device is very evident from the foregoing description.

Having thus described my invention, what I claim, and desire to secure by Letters Patent, is—

1. In a draft-equalizer, the combination of the equalizer-arm I, carrying a single-tree and a double-tree, with the arm E, having a shorter arm, G, raised on it, and the brace F, connecting the end of the arm E to the pole, the parts operating substantially as and for the purpose described.

2. In a draft-equalizer, the combination of the equalizer-arm I, carrying the single-tree and double-tree, with the arm E, brace F, bar N, link O, hook P, and notched link M, all connected and arranged to operate as described.

3. The notched link pivoted to the equalizer-arm, and carrying the double-tree, the hook adapted to engage in the notch, and the sliding link connected to the hook and having proper bearings parallel to the pole, the parts operating to prevent side draft, as and for the purpose specified.

4. The combination, with the equalizer-arm, carrying the single-tree and double-tree, of the clevis-hook, to which the arm is pivoted, and the eye connected to the clevis-hook, and provided with right-angle hooks at its ends, the said eye and clevis hook being removably secured to the curved arm for the purpose of allowing the equalizer to be used without the pole, as and for the purpose specified.

In testimony whereof I affix my signature in presence of two witnesses.

WILLIAM H. BAKER.

Witnesses:
JOHN KESSELL,
LOU. S. WARNER.